United States Patent
de Mello Filho

(10) Patent No.: US 8,311,961 B2
(45) Date of Patent: Nov. 13, 2012

(54) EFFORT ESTIMATION USING TEXT ANALYSIS

(75) Inventor: Moacyr C. de Mello Filho, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 783 days.

(21) Appl. No.: 12/474,314

(22) Filed: May 29, 2009

(65) Prior Publication Data

US 2010/0306143 A1 Dec. 2, 2010

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ........................................ 706/15
(58) Field of Classification Search .................. None
See application file for complete search history.

(56) References Cited

U.S. PATENT DOCUMENTS

| | | | | |
|---|---|---|---|---|
| 2007/0112714 A1* | 5/2007 | Fairweather | ............ | 706/46 |
| 2008/0091404 A1* | 4/2008 | Perrella | ............ | 703/22 |

OTHER PUBLICATIONS

Bode, "Decision support with neural networks in the management of research and development: Concepts and application to cost estimation", Abstract, University Leipzig, marschnerstr. 31 D-04109, Aug. 1998, 2 pgs.

Auer et al, "Implicit Analogy-Based Cost Estimation Using Textual Use Case Similarities", Institue of Software Technology and Interactive Systems, Vienna Austria, 8 pgs., 2005.
Karov et al, "Similarity-based Word Sense Disambiguation", Association for Computational Linguistics, 1998, vol. 24, No. 1, 20 pgs.
Hashimoto, Dynamics of Internal and Global Structure through Linguistic Interactions, MABS '98, LNAI 1534, pp. 124-139, 1998.
PCT International Search Report and Written Opinion, PCT Appln No. PCT/EP2010/057021, Nov. 30, 2010, 11 pages.
Boetticher G. D.: "Applying Machine Learners to GUI Specifications in Formulating Early Life Cycle Project Estimations", 2003, 15 pages.
Auer M. et al: "Implicit Analogy-based Cost Estimation Using Textual Use Case Similarities", Proceedings of the 2nd ACM International Conference on Intelligent Computing and Information Systems, Mar. 2005, 8 pages.
Park H. et al: "An Empirical Validation of a Neural Network Model for Software Effort Estimation", Expert Systems With Applications, vol. 35, No. 3, Oct. 1, 2008, pp. 929-937.

(Continued)

*Primary Examiner* — Jeffrey A Gaffin
*Assistant Examiner* — Li-Wu Chang
(74) *Attorney, Agent, or Firm* — Brian J. Teague

(57) ABSTRACT

A system, method and program product for estimating effort of implementing a system based on a use case specification document. A system is provided that includes: a volumetrics processor that quantifies a structure of the document and evaluates a format of the document; a domain processor that identifies a domain of the system associated with the document; a complexity processor that defines a set of complexity variables associated with the document based on the structure of the document, a format of the document and a domain of the document; and a neural network that estimates an effort based on the set of complexity variables.

12 Claims, 4 Drawing Sheets

OTHER PUBLICATIONS

Auer et al. "Implicit Analogy-Based Cost Estimation Using Textual Use Case Similarities", ICIS, 2005, pp. 8.*

Park et al. "An empirical validation of a neural network model for software effort estimation", Expert Systems with Applications 35, 2008, pp. 929-937.*

Bowden P. et al: "Estimation Support by Lexical Analysis of Requirements documents" Journal of Systems and Software, vol. 51, No. 2, Apr. 15, 2000, pp. 87-98.

Fantechi A. et al: "Applications of Linguistic Techniques for Use Case Analysis" Requirements Engineering, vol. 8, No. 3, 2003, pp. 161-170.

Sawyer P. et al: "Shallow Knowledge as an Aid to Deep Understanding in Early Phase Requirements Engineering" IEEE Transactions on Software Engineering, vol. 31, No. 11, Nov. 2005, pp. 969-981 (section 4).

* cited by examiner

|         | D1  | D2  | D3  | ... | DN |
|---------|-----|-----|-----|-----|----|
| Screen  | 0   | 0   | 0   | 0   | 0  |
| Current | 0   | 0,5 | 0,5 | 0   | 0  |
| Account | 0,3 | 0,3 | 0,3 | 0   | 0  |
| Stator  | 0   | 1   | 0   | 0   | 0  |
|         |     |     |     |     |    |
| SUM     | 0,3 | 1,8 | 0,8 | 0   | 0  |

FIG. 3

|  | Freq | pi | affi | affG |
|---|---|---|---|---|
| Current | 20 | 0.1 | ? | 0.833 |
| Stator | 2 | 0.01 | 1 | 0.833 |
|  |  |  |  | 0.833 |

FIG. 4

EFFORT ESTIMATION USING TEXT ANALYSIS

FIELD OF THE INVENTION

This disclosure is related to evaluating the effort required to implement a system based on a document describing the system, and more particularly to a system and method of evaluating use cases using pattern similarities of text in a document to estimate effort.

BACKGROUND OF THE INVENTION

There exist numerous applications, including project management, in which it may be important to provide an initial evaluation of the development effort required to implement a solution based on a written proposal.

In a typical scenario, upon receiving either a RFP (request for proposal) or a project pre-analysis, the supplier/provider prepares a proposal estimating the requirements in the specification, which itself is often very poorly written and in need of a proper standard. In order to prepare the proposal, the estimate is performed using traditional and empiric methods. In one approach, a proprietary methodology is applied, in a top down fashion, requiring specialized resources and time. In another approach, the estimate is bottom up, potentially being more precise when all the data is available but, in the typical case (in which the specification is poor) the approach is very imprecise and very time-consuming.

In general, these approaches lack efficiency and consistency making it impossible for both the provider and requester to assess different proposals. In practice, very few proposals can actually be analyzed which can greatly limit the likelihood of a successful project.

To address this, the RFP may request effort estimates using some standards, such as man-hours, function points or use case points, thus allowing for external comparisons. Unfortunately, trying to apply cost estimation models, or simple measurements like function points or use case points, provides only limited results since the estimate is either too rough or the modeling takes too much time. In addition, any local knowledge (e.g., how does a current proposal compare to previously evaluated proposals) is frequently ignored in the analysis.

SUMMARY OF THE INVENTION

The present invention relates to a system, method and program product for estimating the effort required to implement a proposal document, such as a use case specification document. In one embodiment, there is a system for estimating an effort to implement a solution associated with a document, comprising: a computing device that comprises: a volumetrics processor to quantify a structure of the document and evaluates a format of the document; a domain processor to identify a domain of the system associated with the document; a complexity processor to define a set of complexity variables associated with the document based on the structure of the document, a format of the document and a domain of the document; and a neural network to estimate an effort based on the set of complexity variables.

In a second embodiment, there is a method for estimating effort for implementing a system associated with a document, comprising: quantifying a structure of the document and evaluating a format of the document using a computing device; identifying a domain of an application associated with the document; defining a set of complexity variables associated with the document based on the structure of the document, a format of the document and a domain of the document; using a neural network to estimate an effort based on the set of complexity variables; and outputting the effort via a tangible medium.

In a third embodiment, there is a computer readable medium having a program product stored thereon for estimating an effort of implementing a system associated with an inputted document, which when executed by a computing device, comprises: code for quantifying a structure of the document and evaluating a format of the document; code for identifying a domain of an application associated with the document; code for defining a set of complexity variables associated with the document based on the structure of the document, a format of the document and a domain of the document; and code for estimating an effort based on the set of complexity variables.

In a fourth embodiment, there is a method for deploying a system for estimating an effort of implementing a system associated with an inputted document, comprising: providing a computer infrastructure being operable to: quantify a structure of a document and evaluate a format of the document using a computing device; identify a domain of an application associated with the document; define a set of complexity variables associated with the document based on the structure of the document, a format of the document and a domain of the document; and use a neural network to estimate an effort based on the set of complexity variables.

BRIEF DESCRIPTION OF THE DRAWINGS

These and other features of this invention will be more readily understood from the following detailed description of the various aspects of the invention taken in conjunction with the accompanying drawings.

FIG. 3 depicts a result matrix for determination of the domain in accordance with an embodiment of the present invention.

FIG. 4 depicts a probability matrix in accordance with an embodiment of the present invention.

Figure 1:
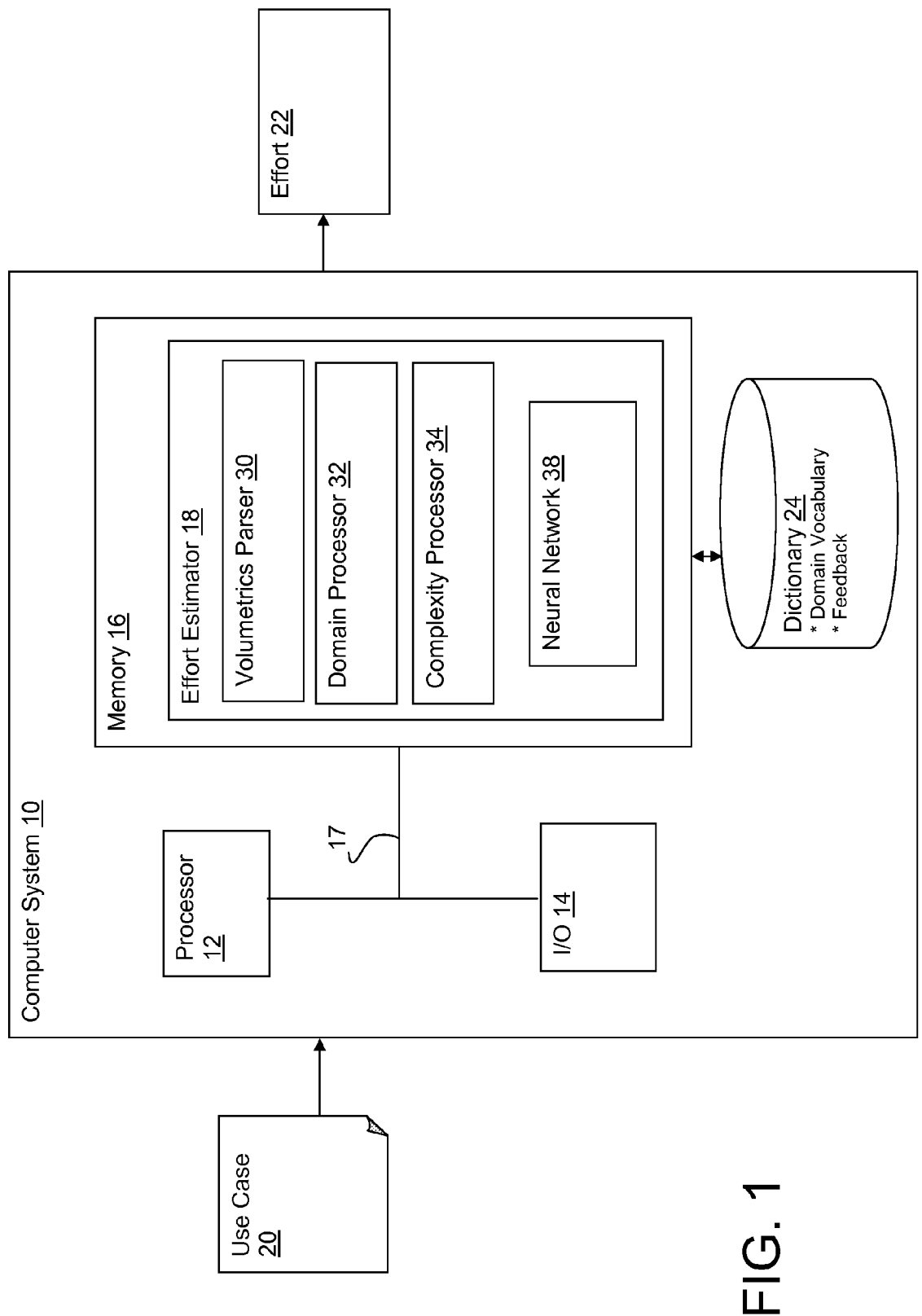
FIG. 1 depicts a computer system having an effort estimator in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention provides a solution for estimating an effort of implementing a system based on an inputted document such a proposal generated in response to for example, a request for proposal (RFP). In an illustrative embodiment, the inputted document comprises a "use case" that is associated with a system, also referred to herein as a use case specification document. Use cases are commonly utilized to describe a behavior of a system as it responds to requests or inputs from outside the system. For example, a web-based merchant use case may define user processes for viewing web pages, adding and removing items from a shopping cart, checking out, etc. The present invention provides a mechanism for evaluating an effort (e.g., amount of man hours) required for implementing a use case through the use of a neural network technology.

FIG. 1 depicts an illustrative embodiment of a computer system 10 for evaluating a use case 20 and outputting a measure of effort 22, such as man hours. Although described as evaluating use cases 20 and generating man hours, the present invention could be directed at any application in which a measure of effort 22 (cost, time, amount of product, etc.) is desired from a set of written data that conforms to some predefined type, standard or specification. In addition, it is noted that use case 20 may be contained in any format, e.g., a printed document, an electronic file, etc. Similarly, effort 22 may be generated in any tangible medium as well, e.g., a printed document, a viewable interface, a storage device, etc.

In general, it is possible to analyze a use case and decompose it in a basic structure. For example:

```
<Use Case> ::=  Brief Description <text>
                Actors <text> | {<text>}
                Basic Flow <text> | {<text>}
                [Alternative Flows <text> | {<text>}]
                [Sub flows <text> | {<text>}]
                [Pre-Conditions <text> | {<text>}]
                [Pos-Conditions <text> | {<text>}]
                [Extention Points <text> | {<text>}]
                [Special Requirements <text> | {<text>}]
                [Miscelaneous <text> | <figure>]
<text> ::= <term> | {<term>}
```

This technique of describing the structure of a use case follows the RUP—IBM Rational Unified Process (Discipline of Requisite Management) standard, which is taught in training courses and process artifacts, such as Use Case Modeling Guidelines, Requirement Management with Use Cases (RMUC) IBM Corp. 2003.

In this description, the <terms> and <figures> are deemed as primitive elements, and, from them, a use case can be understood as a text, a sequence of terms within a special structure. Use cases 20 follow known formation standards, whose completeness can be determined by analyzing of the structure of the inputted specification document.

In the illustrative embodiment described, effort estimator 18 creates three groups of input variables that allow the neural network 38 to recognize complexity. These groups are created by a volumetrics parser 30, a domain processor 32 and a complexity processor 34.

DEFINITIONS

The following definitions and concepts are provided.
1. Similarity—There is a mutual dependence between words and sentences. Similar words appear in similar sentences, and similar sentences are composed of similar words.
2. Affinity—If word occurrence patterns are similar, these words are deemed as having high affinity. In opposition, different word occurrence patterns imply non-affinity with each other.
3. Probability of occurrence—The probability of occurrence of a word in all sentences is defined as a kind of frequency, e.g., a number of occurrences of the word in the text divided by total number of words.
4. Pattern Recognition—The neural network 38 is able to extract basic rules from real data and learn through examples. In this case, the problem involves determining the input variables that can provide enough information to allow the neural network to recognize patterns of complexity.

5. Dictionary—The dictionary 24 stores words and weights from different subjects or matters (i.e., domains), using segmentation of matters and domain vocabulary. New texts (i.e., use cases) are "dictionarized" and analyzed accordingly with affinity and similarity. New texts and words help to dynamically construct the dictionary 24 from the start point of the domain vocabulary.

Volumetrics parser 30 provides a group of variables that indicate the size characteristics of the use case 20. This group of variables characterizes the text volume and the way the text is distributed, and is referred to as "structural or morphological volumetrics." The generated variables quantify the structure of the use case 20 in order to allow evaluating its condition. In an example provided below of structural volumetrics variables, 26 variables are implemented including: number of terms, number of terms in the brief description, number in steps in the basic flow, etc.

Domain processor 32 is responsible for generating variables that assist in identifying the subject or matter of the use case 20, thus identifying the domain of the application. Domain examples, include, e.g., telecommunications, chemical industry, aeronautical industry, financial system, insurance, etc. This set of variables is referred to as the "domain or segmentation of matters," which, besides identifying the matter, provides feedback to dictionary 24, so that the effort estimator 18 itself can create/enhance the vocabulary of the domain. Any number of domain variables can be utilized. Domain variables include, e.g., language, number of found terms of the domain, historical average of the number of found terms, percentage of domain terms in the number of total terms, etc.

Complexity processor 34 determines a complexity or frequency of terms, which are variables characterizing the complexity by calculating the frequencies of occurrence of terms of the domain on the pre-evaluated structures by the structural volumetrics. Complexity variables may include, e.g., the number of domain terms in the brief description, percentage of domain terms in the brief description, number of domain terms in the basic flow, percentage of domain terms in the basic flow, etc. The results are fed into the neural network 38, which in turn calculates effort 22.

Figure 2:
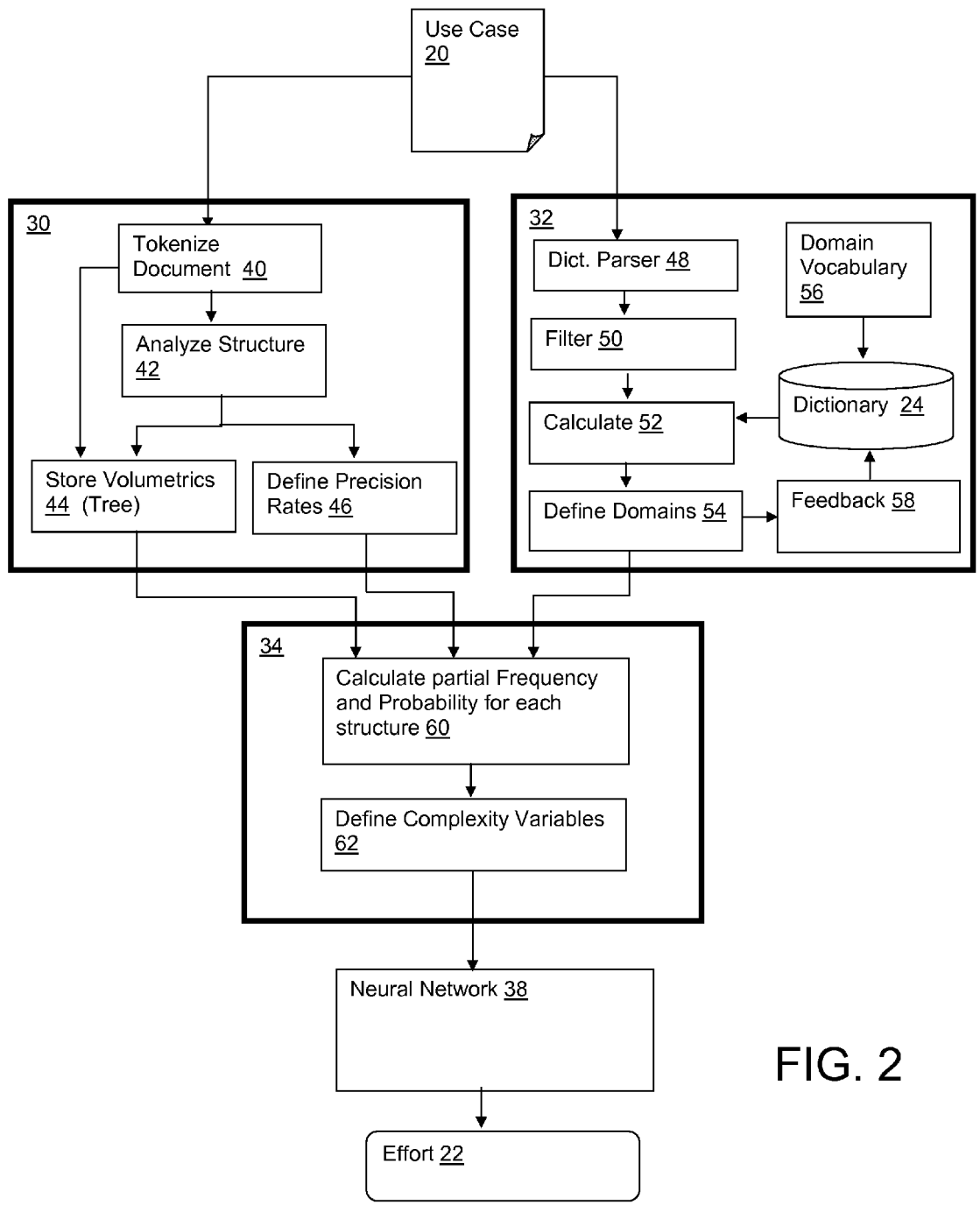
FIG. 2 depicts a process flow of the effort estimator in accordance with an embodiment of the present invention.

Referring to FIG. 2, a more complete system flow is shown. As noted, the first process performed by volumetrics parser 30 involves calculation and storing of volumetrics. After use case 20 is inputted, e.g., using a scanner or some other input process, the original text is collected and a tokenization of the found terms is created 40, the volumetric parser 30 will calculate the number of terms within each document structure, and create a derivation tree that will be kept as a storing structure (i.e., data structure) 44 during the processing. This tree contains the original terms and values of the text found in each document structure. As part of this process, an analysis of proper document formation 42 is performed in order to check the structure of the use case 20. Volumetric parsing can, e.g., analyze the use case to determine if it is complete, whether the basic flow steps are too heavy, whether the use case document should be rejected, etc.

Determining whether the use case 20 is of proper formation is accomplished by evaluating the structures within the use case document against established use case writing standards. Using the formation of parameters, a precision rate (e.g., 0-100) 46 can be used to characterize the state of the use case 20.

For example, points can be awarded for meeting various criteria. For instance, if the use case document is well identified, i.e., has a title and brief description, up to 10 points can be awarded. If the use case document is well outlined, e.g., includes steps on basic flow and alternative flows, an additional 20 points can be awarded. Partial credit can be awarded, e.g., if the brief description is empty, the alternative flow is empty, or the basic flow is empty. If the use case document is well detailed, an additional 70 points could be awarded. The use case document could also be classified as identified, outlined, and/or detailed.

In one illustrative embodiment the following 26 structural volumetrics variables may be utilized:
# of terms
# of terms in the brief description
# of steps in the basic flow
# of paragraphs in the basic flow
medium of terms by step in the basic flow
medium of terms by paragraph in the basic flow
medium of paragraphs by step in the basic flow
# of terms in the alternative flows
# of alternative flows
# of paragraphs in the alternative flows
medium of terms by alternative flow in the alternative flows
medium of terms by paragraph in the alternative flows
medium of paragraphs by alternative flow in the alternative flows
# of terms in the sub flows
# of sub flows
# of paragraphs in the sub flows
medium of terms by sub flow in the sub flows
medium of terms by paragraph in the sub flows
medium of paragraphs by sub flow in the sub flows
# of actors
# of terms in the pre-conditions
# of terms in the post-conditions
# of terms in Special Requirements
# of terms in Miscellaneous
# of inclusions and extensions (Extension points)

The second process, performed by domain processor 32, involves identification of the domain, which may be determined in the following manner. From the stored tree 44, a dictionarization parser 48 creates a one-dimensional vector containing the terms of the text. A next process includes filtering certain terms 50, e.g., removing terms having less than two letters, removing all actor names in the text, and applying an elimination vocabulary. This vocabulary comprises terms deemed as non-expressive for recognizing domains. Next, the domain processor 32 will analyze each term of the vector to locate the term in the dictionary 24, which associates terms with possible domains. In many cases, a given term may be associated with more than one domain.

Once a set of candidate domains (the orderly series of most probable candidate domains) are found, the domain processor 32 will calculate 52 the absolute frequency (freq), the probability or relative frequency (p), the affinity (aft) and the global affinity or cohesion (affG) for each term, and will create a frequency matrix from them, such as that shown in FIG. 4. For example, FIG. 4 shows the terms "current" and "stator" that are words from the one-dimensional vector of the original text. Because the word "stator" was found in the dictionary, the value of aff(stator) is set to 1. The global affinity or cohesion affG of the one-dimensional vector is calculated and determined to be equal to 0.833. Probability values of p(stator) and p(current) are used to calculate the affinity, aff(current), initially unknown and non-existent in the dictionary. In this example: 0.01, 0.1 and 8.37154 . . . respectively.

The definitive domain definition will be made by verifying, in the most probable order, if the number of terms found and the global affinity (cohesion) are within the historic range of these values stored in the dictionary 24. (Note: it is possible to substitute algebraic criteria for the use of an ancillary neural network, with the exclusive purpose of recognizing the domain).

A dictionary feedback process 58 is implemented for identifying new terms in the use case 20 with affinity higher than the global affinity, and for introducing those terms into the dictionary 24, thus updating the stored affinity. An initial domain vocabulary 56 may be utilized to begin formation of the dictionary 24, prior to obtaining feedback over time. As the iterations of feedback occur, the dictionary 24 will be self-constructed.

In one illustrative embodiment, the determination of candidate domains may be implemented using a simple procedure of punctuation or probability, according to the appearance of the term in one or more domains. To illustrate this procedure, see FIG. 3. For instance, if a term is present in three domains it receives the probability of ⅓; if it is present in two domains, ½; if it is only found in one domain, the term receives the probability 1 and so forth. In the example of FIG. 3, we have domain D2 with the highest value of the sum, therefore D2 will be considered the most likely domain for the words of the one-dimensional vector.

Probability P is thus defined:

$$P(w'i,D_N)=1/N$$

where w'i is the term found in a certain domain D and N is the total number of domains in the dictionary.

$$\text{SUM}=\text{Sum of } P(w'i) \text{ in the domain } D$$

The largest sum for a domain determines the domain or it creates an orderly series of candidate domains.

$$D=\{D2,D3,D1\}$$

where D is the orderly series of most probable candidate domains.

The frequency matrix is determined as follows. To define the frequency matrix of a term vector a cohesion parameter is first defined between the terms of the vector and the domain of the dictionary. That parameter will be the proportion among the terms of the vector, located in the domain, and the total number of terms of the vector.

Global affinity or cohesion in relation to the domain is defined as:

$$affG=\#w'i/n$$

where #w'i is the number of terms belonging to the text, found in a certain domain D in the dictionary, n is the total number of original terms in the text (after the filtering process).

wi is the number of terms belonging to the text

Absolute frequency (freq) is the number of appearances of the term: # wi

Probability or relative frequency of the term will be:

$$p(wi)=\#wi/n$$

Affinity is a measure that is calculated among a certain term (wi) and all the other terms that were located in the domain (w'i). That measure is proportional to the reason among the appearance probabilities and it can be defined as a proportional average to the probabilities and the cohesion factor:

$$aff(w_i)=\text{SQRT}(\text{SUM}[p(w_i)/p(w'j).aff_G]^2)\, j=1\ldots\#w'i$$

In one illustrative embodiment, the following 21 domain variables could be utilized:
language domain
\# of found terms of the domain
\# of found terms of the domain (last)
\# of found terms of the domain (next to the last)
\# of found terms of the domain (before-next to the last)
historical average of the # of found terms
standard deviation of the # of found terms historical average
% of domain terms on the # of total terms
% of domain terms on the # of total terms (last)
% of domain terms on the # of total terms (next to the last)
% of domain terms on the # of total terms (before-next to the last)
historical average of the global affinity
standard deviation of the global affinity historical average
\# of terms of last UC
\# of terms of next to the last UC
\# of terms of before-next to the last UC
\# of loaded terms in the dictionary
\# of terms of last UC loaded in the dictionary
\# of terms of next to the last UC loaded in the dictionary
\# of terms of before-next to the last UC loaded in the dictionary Complexity processor 34 provides the third step of the process, calculation of complexity. Once the domain is defined 54, the dictionary 24 is updated with feedback 58, the precision rate is defined 46 by the condition analysis, and the volumetrics is stored 44, complexity variables may be calculated by the complexity processor 34. In one illustrative embodiment, the complexity processor 34 first sweeps the stored tree and seeks the terms now found in the dictionary 24 (i.e., after the feedback), and then calculates the frequencies and partial probabilities of those terms in each element of the structure 60.

To define the complexity variables 62, the complexity processor 34 will compose a uni-dimensional vector with the obtained variables (i.e., in the steps described, in u1, u2 ... u64. A second uni-dimensional vector (i.e., bias) contains the associated weights to the inputs, w1, w2 ... w64, to be determined initially in the following way:

Volumetrics receives light weights 20%;
Domain receives heavyweights 100%; and
Complexity receives intermediate weights 70%.

With the learning iterations of the network these weights can be adjusted to reflect training the group better. The neural network 38 then receives as input the vectors of variables and weights and it supplies the proportional effort to the effort recognized during the learning.

As an example, the following 17 complexity variables may be utilized:
\# of domain terms in the brief description
% of domain terms in the brief description
\# of domain terms in the basic flow
% of domain terms in the basic flow
\# of domain terms in the alternative flows
% of domain terms in the alternative flows
\# of domain terms in the sub flows
% of domain terms in the sub flows
\# of domain terms in the pre-conditions
% of domain terms in the pre-conditions
\# of domain terms in the pos-conditions
% of domain terms in the pos-conditions
\# of domain terms in the Special requirements
% of domain terms in the Special requirements
\# of domain terms in the Miscellaneous
% of domain terms in the Miscellaneous
\# of domain terms in the Actors names As noted, in order to implement the neural network 38, the input variables are first identified. According to the pattern presented by these variables, the neural network 38 will recognize and associate pattern to an effort during the learning period. The nature and number of input variables are important to allow variability of patterns and covering different types of systems. Essentially, they will be combinations of volume measurements and complexity of terms (domain), and thus concepts are borrowed from the linguistics field.

One purpose of the neural network 38 on the method of effort estimation is to obtain pattern recognition. The neural network 38 will be able to extract basic patterns from input data (i.e., the input variables). In this case, the problem involves determining the input variables that can provide enough information to allow the neural network 38 to recognize patterns of complexity and then calculate effort 22 (e.g., man hours). The high level operational description of the neural network is as follows:

(1) Signals are presented at the input;
(2) Each signal is multiplied by a weight indicating the signal's influence in the neural network unit's output;
(3) The weighted sum of the signals is made, producing a certain activity level;
(4) If this activity level exceeds a limit (i.e., threshold), the unit produces an output.

In addition to input and output variables, there are values in the local memory, which are used for each iteration. The capacity of storing memory and subsequently reacting from this stored information produces the learning phenomenon.

An illustrative implementation of a neural network may include, e.g., a multilayer perception with three layers. Such a design may include:

64 input variables;
26 variables with light weights from the volumetric group;
21 variables with heavy weights from the domain group; and
17 variables with intermediate weights from the complexity group;

Weights (i.e., bias vector): w1, w2, ... w64, may be gauged initially in the following way:

Volumetrics receives light weights 20%;
Domain receives heavyweight 100%;
Complexity receives intermediate weight 70%.

(With the learning iterations of the network these weights can be gauged to reflect the training group better.) The design may further include:

Input layer: 64 neurons;
Hidden layer (apply 2*input+1): 129 neurons; and
Output layer: 1 neuron.

Note of course that this is an initial design that could be changed according ongoing needs.

In one alternative embodiment, the invention could be implemented using two neural networks. The second network (i.e., an ancillary neural net) could be used to recognize the domain, in place of that described above.

Note also that the invention is not limited to use cases. For instance, an alternative embodiment could apply the same concepts to "user stories," another technique to gather requirements. While user stories do not have the same formalism as use cases, a user stories is akin to the brief description of the use case. Thus, the approach could be to limit the award of the user stories to, e.g., only 10 points. Accordingly, estimating user stories will be always with less precision than estimating detailed use cases. The same approach could apply to "declaratives statements," another form used to specify requirements. The short text of declaratives statements would provide similar precision as User Stories.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered on a subscription or fee basis. For example, a computer system 10 comprising an effort estimator 18 could be created, maintained and/or deployed by a service provider that offers the functions described herein for customers. That is, a service provider could offer to deploy or provide the ability to analyze use cases 20 as described above.

It is understood that in addition to being implemented as a system and method, the features may be provided as a program product stored on a computer-readable storage medium (or computer-readable medium for short), which when executed, enables computer system 10 to provide an effort estimator 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for estimating an effort to implement a solution associated with a document, comprising:
   a computing device that comprises:
      a volumetrics processor to quantify a structure of the document and evaluates a format of the document;
      a domain processor to identify a domain of the system associated with the document;
      a complexity processor to define a set of complexity variables associated with the document based on the structure of the document, a format of the document and a domain of the document; and
      a neural network to estimate an effort based on the set of complexity variables;
      wherein identifying the domain comprises filtering unnecessary terms and associating each remaining term with one or more domains, and wherein identifying the domain is based upon a calculated frequency, probability and affinity.

2. The system of claim 1, wherein the document comprises a use case.

3. The system of claim 1, wherein the structure is quantified with a set of structural volumetric variables that characterize terms within the document.

4. The system of claim 1, wherein the format of the document is evaluated based on a predefined standard.

5. The system of claim 1, further comprising a feedback process for updating a dictionary with terms from the document.

6. The system of claim 1, wherein the complexity variables are calculated by analyzing the frequencies and partial probabilities of terms.

7. A non-transitory computer readable medium having a program product stored thereon for estimating effort of implementing a system associated with a document, which when executed by a computing device, comprises:
- code for quantifying a structure of a document and evaluating a format of the document;
- code for identifying a domain of an application associated with the document;
- code for defining a set of complexity variables associated with the document based on the structure of the document, a format of the document and a domain of the document; and
- code for estimating an effort based on the set of complexity variables;
- wherein code for identifying the domain comprises code for filtering unnecessary terms and associating each remaining term with one or more domains, and wherein identifying the domain is based upon a calculated frequency, probability and affinity.

8. The computer readable medium of claim 7, wherein the document comprises a use case.

9. The computer readable medium of claim 7, wherein the code for quantifying the structure includes code for defining a set of structural volumetric variables that characterize terms within the document.

10. The computer readable medium of claim 7, wherein the format of the document is evaluated based on a predefined standard.

11. The computer readable medium of claim 7, further comprising code for using a feedback process for updating the dictionary with terms from the document.

12. The computer readable medium of claim 7, wherein the complexity variables are calculated by analyzing the frequencies and partial probabilities of terms.

* * * * *